Feb. 28, 1950 E. F. VOBEDA 2,498,969
LENGTHENING ATTACHMENTS FOR MICROMETERS
Filed July 20, 1946

INVENTOR.
EDWIN F. VOBEDA
BY
ATTORNEYS.

Patented Feb. 28, 1950

2,498,969

UNITED STATES PATENT OFFICE 2,498,969

LENGTHENING ATTACHMENTS FOR MICROMETERS

Edwin F. Vobeda, Racine, Wis.

Application July 20, 1946, Serial No. 685,033

1 Claim. (Cl. 33—167)

My invention refers to depth gauge attachments for micrometers, and it has for its primary object to provide a female adapter sleeve, in different lengths, for measuring male machine part units, such as stud lengths, whereby said stud lengths are telescoped by the adapter sleeve to obtain accurate measurements.

In practice, so far as I am aware, adapters or depth gauge attachments to a micrometer, are of the male type only; such male adapters, or "depth gauges," have been employed in connection with standard micrometers, as disclosed in Patent Number 1,370,310, or micrometers of the well-known Starrett type.

In such depth gauges, when it is desired to measure a stud unit, the micrometer anvil is alined, side by side, with the stud, having the depth gauge in abutment with the upper end of said stud.

Hence, in this type of gauge depth, it is impossible to maintain axial alinement between the micrometer anvil, and the stud unit, due to the fact that there is no mechanical means for positively fixing a micrometer in vertical alinement with the stud unit.

With my improved female adapter, or gauge sleeve, the stud is encased and alined with the instrument and the bottom of the sleeve, which engages the base of the stud unit, rests squarely upon said base whereby perfect alignment of the parts will result. Thus the anvil, when adjusted to the top of said stud, will readily indicate the length thereof by reading the scale upon the micrometer in the usual manner.

A further object of my invention is to provide ring attachments to the bottom of the sleeve adapter, wherein the core of the sleeve is of a diameter which will engage the base of the stud unit irrespective of its circular dimension.

A further object of my invention is to provide a standard length adapter sleeve, for use with reference to measurements within the scope of the micrometer anvil, the same being of definite length corresponding to the adjusted length of the anvil, in which position the micrometer scales will designate zeros.

A still further object of my invention is to provide adapter sleeves of different known lengths, to be attached to the standard sleeve, for the purpose of measuring stud units of greater length than the capacity of the standard sleeve.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figure 1:
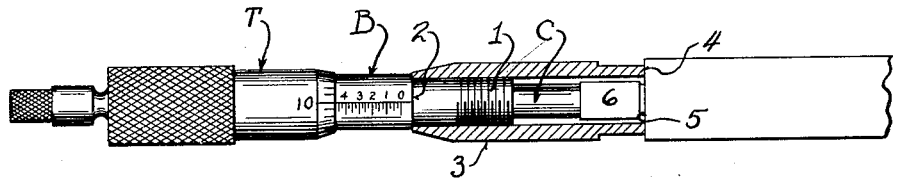
Fig. 1 represents a side elevation of a standard micrometer having fitted thereto a standard length adapter sleeve embodying the features of my invention, the same being in section to more clearly illustrate the structural features.

Referring by characters to the drawings, B indicates a standard micrometer barrel having mounted thereon the usual thimble T, the beveled end face of which is provided with scale graduations and the barrel with vertically disposed graduations. The barrel has telescopically mounted therein the usual anvil C, all of which assemblage is no part of my invention but simply illustrates a standard micrometer.

The end of the barrel is provided with a screw threaded section 1 and said end is shouldered as indicated by numeral 2.

A sleeve 3, which may be termed as of standard length, is in screw thread connection with the barrel threads 1 and its inner end is in abutment with the barrel sleeve 2, whereby said sleeve may be quickly fitted to the micrometer when desired.

The bottom face 4 of the sleeve, is planed off at a right angle to the sleeve axis.

As indicated in Figure 1, the bottom sleeve end 4 abuts the shouldered base 5 of a stud unit 6, which parts illustrate a machine element that is to be accurately finished.

When it is desired to measure the length of the stud 6 as exemplified in Figure 1 of the drawings, the anvil C is retraced, to clear the end of the stud and thereafter when the micrometer and its associated adapter sleeve, are fitted to the machine element, the stud 6 is encased within the aforesaid sleeve and the face bottom 4 of said sleeve, is in engagement with the base 5 of the machine element.

Thereafter, to accurately determine the length of the stud 6, all that is necessary, is to rotate the thimble T, whereby the end of the anvil C will come into abutment with the corresponding end of the stud.

The length of the stud is thus determined by reading of the micrometer scales in the usual manner, bearing in mind that the said micrometer is in axial alinement with the stud unit to be measured.

Figure 2:
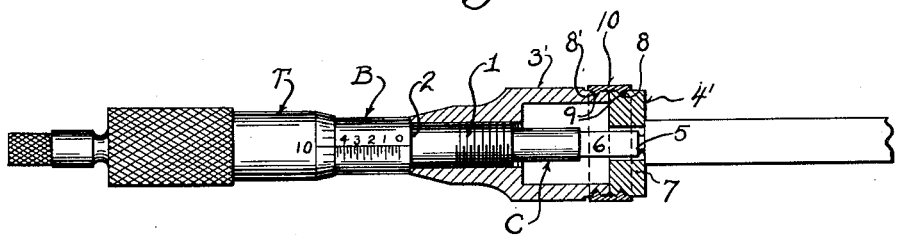
Fig. 2 is a similar view illustrating a shorter length sleeve and a ring attachment thereto, these parts being in section.
Figure 3:
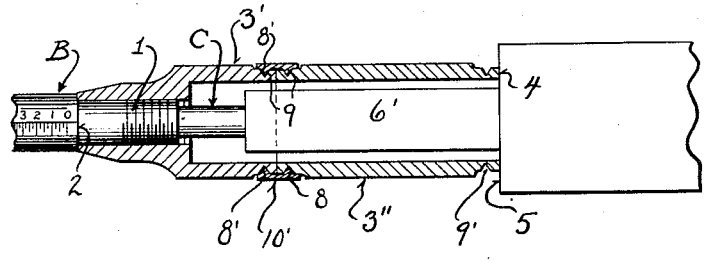
Fig. 3 is a fragmentary elevation of a micrometer illustrating a pair of sleeves coupled together and in section to more clearly illustrate structural features.

As illustrated in Figure 2 of the drawing, when the shouldered base 5 of the stud 6 is of slightly less radial diameter than said stud, the mouth of the adapter sleeve must be considerably reduced in diameter, to insure the mouth and the base of the aforesaid sleeve, being in accurate engagement with said base.

With the above adjustment in view, I provide a supplemental sleeve section 7 having peripheral V-shaped grooves 8 therein. The bore of this ring is of slightly greater diameter than the stud 6, as shown.

Figure 4:
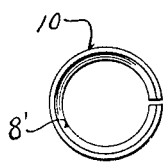
Fig. 4 is a face view of a spring coupling ring for attaching rings or sleeve lengths together.
Figure 4:

The upper face of the sleeve section 7 is fitted to the bottom face 4 of the adapter sleeve 3'. This adapter sleeve, is provided with a peripheral V-shaped groove 8', adjacent to the end of said sleeve, as shown. These parallel grooves are engaged by V-shaped internal ribs 9, 9, of a spring band 10, which band is split as indicated in Figure 4 of the drawings. The snapping of the band over the joint between the ring 7 and end of the sleeve 3', these parts are firmly coupled together by the V-shaped coupling grooves 8, 8' and corresponding V-shape rib of the spring band, whereby the internal bore of the sleeve is reduced to insure proper seating of the adapter, for measuring the stud as indicated in Figure 2 of the drawings. It is understood in this exemplification of my invention, the combined length of the ring and sleeve, equal the standard length of a sleeve, such as illustrated in Figure 1 of the drawings. It is apparent, after the two part sleeve, illustrated in Figure 2, is fitted to the machine element unit for measurement, the said measurement is obtained in the same manner as that previously described with reference to Figure 1, whereby the stud length is determined.

When it is desired to measure a stud 6' of much greater length than that previously described, the sleeve section 3', which is attached to the micrometer, must be materially lengthened for measurement of the stud 6'. With this in view, I provide an auxiliary sleeve section 3'', which sleeve section is of known length and its upper end is coupled to the sleeve section 3' by the V-shaped grooves and band 10'' which coupling connection is identical with that previously described in connection with Figure 1 of the drawings. As shown, adjacent to the bottom end of the auxiliary sleeve 3'', I provide a V-shaped groove 9' for the purpose of attaching a ring thereto when desired. Hence, it is apparent that the long stud 6' may be readily measured as to length when the coupled adapter sleeves are fitted thereto in the same manner as previously mentioned.

I claim:

In a standard micrometer having a sleeve and a supplemental sleeve section having abutting ends, and V-shaped grooves respectively, a split spring band having a pair of V-shaped ribs engaging the V-shaped grooves of the sleeve and supplemental sleeve section, whereby through spring pressure exerted by the split band, the V-shaped ribs therein will exert a draw pressure upon the sleeve and supplemental sleeve section to firmly hold the same in abutting contact.

EDWIN F. VOBEDA.

REFERENCES CITED

The following references are of record in the file of this patent:

UNITED STATES PATENTS

| Number | Name | Date |
|---|---|---|
| 311,299 | Elliott | Jan. 27, 1885 |
| 502,686 | Tilton | Aug. 1, 1893 |
| 738,503 | Waters | Sept. 8, 1903 |
| 796,903 | Farrar | Aug. 8, 1905 |
| 827,453 | Leach et al. | July 31, 1906 |
| 1,459,896 | John | June 26, 1923 |
| 1,559,801 | Steinle | Nov. 3, 1925 |
| 1,952,965 | Beard | Mar. 27, 1934 |
| 2,192,069 | Cox | Feb. 27, 1940 |